United States Patent [19]

Van Gils

[11] 3,859,239

[45] Jan. 7, 1975

[54] ADHESIVE FOR BONDING RUBBER TO STEEL

[75] Inventor: Gerard Edward Van Gils, Tallmadge, Ohio

[73] Assignee: The General Tire & Rubber Company, Akron, Ohio

[22] Filed: Oct. 16, 1972

[21] Appl. No.: 298,166

Related U.S. Application Data

[63] Continuation-in-part of Ser. No. 162,615, July 14, 1971, abandoned.

[52] U.S. Cl.. 260/28.5 B, 260/29.7 NR, 260/836 R, 260/837
[51] Int. Cl........................ C08f 45/52, C08f 33/08
[58] Field of Search.... 260/28.5 B, 29.7 NR, 836 R, 260/837

[56] References Cited
 UNITED STATES PATENTS

| 3,484,338 | 12/1969 | Britton | 161/216 |
| 3,639,500 | 2/1972 | Muny et al. | 260/837 R |
| 3,673,274 | 6/1972 | Tomalia et al. | 260/837 R |
| 3,678,130 | 7/1972 | Klapprott | 260/28.5 B |
| 3,715,266 | 2/1973 | Winters et al. | 260/837 R |

OTHER PUBLICATIONS

Skeist, Handbook of Adhesives, page 448 relied upon.

*Primary Examiner*—Morris Liebman
*Assistant Examiner*—S. L. Fox

[57] ABSTRACT

This invention is a water-based, curable adhesive for bonding rubber to bright steel that provides high bonding strength with good long term bond aging characteristics. The adhesive comprises an admixture of a styrene-butadiene-carboxylic acid polymeric latex, a water-soluble epoxy compound and an epoxy curing agent.

12 Claims, No Drawings

ADHESIVE FOR BONDING RUBBER TO STEEL

CROSS REFERENCE TO RELATED APPLICATION

This application is a continuation-in-part of U.S. patent application Ser. No. 162,615 filed July 14, 1971, now abandoned.

BACKGROUND OF THE INVENTION

This invention pertains to the field of adhesives. More particularly, this invention concerns adhesives for bonding elastomers to iron containing metals.

There are many products that require rubber bonded to metal such as electrical components like rubber isolators, pry bars, switch gear; industrial products like bridge bearings, dock bumpers, and hangers; and automobile parts like bushings, engine mounts, shock absorbers, and foot pedals. In this latter group is the growing importance of steel cord reinforced pneumatic tires.

Bonding rubber to different substrates involves a variety of factors such as the polarity between the respective substrates, the composition of the metal, the presence of lubricants, the difficulties encountered with foreign matter at the interface, to name just a few. Specifically with respect to steel and steel alloys and further with respect to steel cord used in reinforced rubber tires, bonding the rubber to the steel has posed extremely difficult problems. Not only is the surface of steel somewhat incompatible with many adhesives and many rubber compounds, but steel has a tendency to corrode in the presence of water-containing adhesives and rubbers so that both initial and long-term bonding has to be conducted under rather anhydrous conditions.

Presently, there are two useful methods of bonding rubber to steel; one is to plate the steel surface with brass for direct contact to the rubber, and the other is by the use of a non-aqueous, i.e., organic solvent-based adhesive on the steel prior to pressing the rubber into contact therewith. These practices develop acceptable bonding but involve a variety of disadvantages. Brass plating is extremely expensive, tends to fail in areas of curvature in the steel, and is very sensitive to the composition of the rubber. The organic solvents in the adhesives produce a toxic environment and the risk of fire. Further, the bond between rubber and brass-plated steel and between rubber and conventional adhesive coated steel deteoriate with time; this occurrs when the adhesive coated steel and the rubber coated steel is exposed to air. These adhesion problems have increased to the point that the compounder must first compound the rubber to obtain usable adherence to the metal and then alter the compound to enhance rubber properties. Thus, compounders are severely restricted in their use of rubbers. There appears in the art, therefore, a real need for a better adhesive for bonding rubber to metal.

Adhesives have been prepared from various polymers such as epoxy modified butadiene-styrene latices (U.S. Pat. Nos. 3,316,195 and 3,312,754), epoxy modified styrene-acrylic acid latices (U.S. Pat. No. 2,784,128), carboxylated polybutyl acrylates (U.S. Pat. No. 3,465,058), and styrene-butadiene-itaconic acid latices (U.S. Pat. No. 3,165,434) however these have been found to give either very poor bonding between rubber and bright steel and/or rapidly deteriorate in bond strength upon exposure of the adhesive-coated steel or the rubber-adhesive-steel laminate to air. In addition, others have used various combinations of styrene, butadiene, carboxylic acids, and epoxy compounds for adhesive uses, such as are disclosed in U.S. Pat. Nos. 2,944,044; 3,131,158; 3,150,112; 3,312,754; 3,386,939; and 3,399,080. However, none of these adhesives or other uses of the polymers has satisfied the problem of bonding rubber to bright steel.

This invention is a water-based adhesive for bonding bright steel and bright alloy steel to natural rubber and synthetic replacements for natural rubber that provides high bonding strength with good long term bond aging characteristics. It comprises an admixture of a styrene-butadiene-carboxylic acid polymeric latex, a water-soluble epoxy compound, and an epoxy curing agent wherein these ingredients are used within specifically confined ranges. The steel should not be brass coated, but used in the "bright" (uncoated) condition. However, it should be provided with a corrosion resistant treatment (where necessitated by the corrosion properties of the steel) such as by phosphatizing, soaking in chromic acid or nitrates, or otherwise. This inventive adhesive composition promotes exceptionally good bonding between natural rubber, polyisoprene, polybutadiene, and other synthetic replacements for natural rubber and bright steel and bright steel alloy surfaces. In addition, this composition has many other uses such as a coating, carrier for paints, colorants, etc.

Therefore, the main object of this invention is an adhesive for bonding bright steel and bright steel alloy to natural rubber and synthetic replacements therefor. Other objects of the invention include a curable composition that is aqueous-based, non-toxic, non-flammable, simple to use and apply, that has a good shelf life, is stable, and relatively inexpensive. Further objects include a method of increasing the rubber compounder's latitude in compounding rubber without such emphasis on achieving good adhesion to metal; an adhesive that provides improved long term bond strength between rubber and metal upon either exposure of the adhesive coated metal or the rubber encased adhesive coated metal to air. Still further objects include a method of bonding bright steel tire cord to rubber by preparing an aqueous curable cord dip comprising a styrene-butadiene-carboxylic acid polymeric latex, water-soluble epoxy compound, and epoxy curing agent; coating the steel tire cord with the dip; drying and curing the coating, and then combining the cured coated wire cord with natural rubber or synthetic replacements for natural rubber wherein this method is simple, safe, and produces consistently good bonding between the steel tire cord and the encasing rubber.

SUMMARY OF THE INVENTION

This invention pertains to a composition for bonding bright steel and bright alloy steel to natural rubber and synthetic replacements therefore comprising the following admixture wherein the ingredients are in parts by weight per 100 parts by weight of latex solids:

a. a styrene-butadiene-carboxylic acid polymeric latex having a styrene to butadiene ratio of from 30:70 to 70:30 and containing the polymerization product of from 0.5 to 2.5 parts of a polymerizable carboxylic acid;

b. an epoxy compound, that is water soluble to the extent of at least 97% by weight, in an amount from about 10 to 50 parts; and c. at least a curable amount of an epoxy curing agent.

DESCRIPTION OF THE PREFERRED EMBODIMENT

The composition of this invention is useful inter alia for bonding bright steel and bright alloy steels to natural rubber and snythetic replacements therefore. By "steel" is meant a malleable alloy of iron and carbon, usually containing substantial quantities of manganese. By "alloy steel" is meant steel that owes its distinctive properties chiefly to some element or elements other than carbon or jointly to such other elements and carbon; some of the alloy steels necessarily contain an important percentage of carbon, even as much as 1.25%. It should be noted, however, that there is no agreement as to where the line between alloy steels and steel is customarily drawn.

The term "natural rubber" means rubber obtained from botanical sources, primarily from the hevea brasiliensis tree; and also from other trees such as ficus elastica, shrubs, such as parthenium-argentatum; and vines such as landolphia. By the term "synthetic replacements" is meant synthetic replacements for natural rubber such as polyisoprene, polybutadiene, emulsion polymerized styrene-butadiene copolymers, solution polymerized styrene-butadiene copolymers, and styrene-butadiene rubbers made by the "Alfin" process which is a polymerization catalyzed chiefly by a mixture of allyl-sodium, sodium isopropoxide, and sodium chloride. Of course, mixtures of any of these above-stated materials would also qualify as "synthetic replacements" for natural rubber.

A number of steels and alloy steels are in a variety of rubber containing products such as tire belts, tire beads, drive belts, and bushings. By "bright" is meant, as aforesaid, that the steel is not brass plated but is treated to prevent or at least reduce corrosion such as by phosphatizing, chromic acid soaking, or nitrate treatment, etc. where required. That is, some steels are highly corrosion resistant without extra treatment; in these cases no treatment is needed. In addition, these bright steels and alloy steels are generally sandblasted and pickled in acids to remove traces of foreign matter. Specific among the alloy steels usable with the curable adhesive composition of this invention is the type known as E4130 which is an electric furnace steel containing carbon, manganese, chrome, and molybdenum as alloying agents. It is one of the types that does not require a corrosion resistant treatment. The steel or alloy steel may be used in a variety of sizes and shapes such as plates, billets, bar stock, formed products, cords and braided steel wire, and other configurations. Particularly important, however, are steel wires and cords useful as reinforcement in the carcass of pneumatic tires. Among these tire cord steels is the type known as "Bekaert" steel tire cord made by the Bekaert Steel Corporation and has the following composition:

| | |
|---|---|
| carbon | 0.701 % |
| manganese | 0.490 % |
| sulfur | 0.020 % |
| phosphorus | 0.018 % |
| silicon | 0.280 % |
| copper | 0.021 % |
| chromium | 0.010 % |
| nitrogen | 0.005 % |
| iron | balance |

The first portion of the composition of this invention is a styrene-butadiene-carboxylic acid polymeric latex. The ratio of styrene to butadiene may be varied from between 30:70 to 70:30 parts by weight; however, it is preferred that the ratio lie between 50:50 and 40:60 to obtain the greatest degree of adhesion when used to bond rubber to bright steel. In addition, the latex must contain the polymerization product of from about 0.5 to about 2.5 parts (by weight per 100 parts of rubber latex solids) of a polymerizable carboxylic acid.

The latex is generally prepared by emulsifying the styrene and butadiene monomers in water with a surface active agent and then adding a polymerization catalyst under agitation and optionally the application of heat. For instance, a mixture of 50 parts by weight of styrene monomer and 50 parts by weight of butadiene monomer may be polymerized in water in the presence of a few parts of a commercial surfactant and ammonium persulfate as a polymerization catalyst under high agitation at a temperature of about 60°C. It has been found particularly advantageous to withhold the addition of the carboxylic acid until after the styrene-butadiene polymerization has proceeded well along. In this way, the acid molecules are polymerized onto the outside of the latex particles and consequently are more effective with respect to bonding the rubber to the steel. Other additives, conventional with emulsion polymerization, may be added to control or affect various phases of the polymerization and the polymer such as sequestering agents, antifoam agents, buffers, short-stops, stabilizers, thickeners, etc. The use of these additives are fully within the ambit of one skilled in the rubber polymerization art and need not be discussed further.

A wide range of polymerization catalysts may be used to make the latex such as the aforementioned ammonium persulfate, tert-butyl hydroperoxide, ferrous iodide, isopropyl peroxydicarbonate, potassium iodide, sodium perborate tetrahydrate, and the like.

It is necessary for the operability of this invention that the latex contain the polymerization product of from about 0.5 to about 2.5 parts of a polymerizable carboxylic acid. Although not fully understood, it is thought that the extremely high level of adhesion between the bright steel and the rubber is due in part to the formation of a carboxylic acid salt of the metal in the steel. It is necessary that the carboxylic acid be polymerizable (hence unsaturated) so that it may enter into polymerization with the styrene and butadiene and become a part of the final polymer. It is further desired that the carboxylic acid be either a monocarboxylic acid, a dicarboxylic acid, or a tricarboxylic acid as higher order carboxylic acids tend to be difficult to solubilize or emulsify in the altex.

Examples of polymerizable carboxylic acids usable herein include maleic anhydride, fumaric acid, maleic acid, itaconic acid, methacrylic acid, and acrylic acid. Mixtures of these polymerizable carboxylic acids may be used and are fully contemplated in this invention.

The usable range of carboxylic acid is limited to 0.5 to 2.5 parts by weight. Below 0.5 parts there is a drastic loss of adhesive power. Above about 6.0 parts there is a significant loss of adhesive power combined with the onset of latex thickening problems.

A water-soluble epoxy compound is added to the latex in an amount ranging from about 10 to about 50 parts by weight per 100 parts by weight of latex solids.

"Water-soluble" is used herein to mean an epoxy compound that is water soluble in the total system to the extent of at least 97% by weight. Thus, epoxy compounds that are less than 97% water soluble are considered water insoluble and inoperable in this invention whereas epoxy compounds that are 97% and more water soluble are considered water soluble and fully operable in this invention. Epoxy compounds are those that contain epoxy or ethoxyline groups which serve as terminal linear polymerization points for the compound molecules. A wide variety of water-soluble epoxy compounds are usable herein including glycidyl ethers of glycerol, ethylene glycol, trimethylol propane and 1,3 butanediol; glycidyl acrylate and methacrylate; diglycidyl ether and allyl glycidyl ether. Preferred among these epoxy compounds are diglyciyl ether of 1.4 butanediol and glycidyl ether of glycerol. Generally, these epoxy compounds are liquids with average molecular weights ranging from about 100 to 450, have epoxide equivalents ranging from between 50 to 300 or more, and come in various viscosities such as between 10 to 15,000 centipoise. In the normal practice of this invention, the water-soluble epoxy compound is diluted with water (and optionally a surfactant is added) and thereafter stirred into the latex.

The next essential ingredient of the composition of this invention is a curing agent for the epoxy compound. By curing agent is meant an agent that opens the epoxy groups to cross connect or cross link the various epoxy-containing molecules. Useful in this invention are polyfunctional primary and secondary amines and some tertiary amines including, for example, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1.2-diamino-2-methylpropane, 2,3-diamino-2-methylbutane, 2,4-diamino-2-methylpentane, 2-diamino-2,6-dimethyloctane, dibutylamine, dioctylamine, dinonylamine, distearylamine, diallyl amine, dioleylamine, dicyclohexylamine, methylethylamine, ethylcyclohexylamine, o-tolylnaphthylamine, pyrrolidine, 2-methylpyrrolidine, tetrahydropyridine, 2-methylpiperidine, 2,6-dimethylpiperidine, diaminopyridine, tetraethylene pentamine, and metaphenylene diamine. Particularly preferred as being effective in this invention are epoxy curing agents such as diethylene triamine, triethylene tetramine, tetraethylene pentamine, polyethylene imine, and m-phenylene diamine.

The curing agent may be water-soluble or waterdispersible; both are operable herein. Although most amine curing agents for epoxy compounds are water-soluble, there are a few commercially available water dispersible agents such as Versamid 125 (from General Mills) and Tonox™ LC (from Uniroyal). These may be dispersed in water using conventional surfactants such as Tween 40 (from Atlas Powder Co.).

The amount of epoxy curing agent used in the composition is designated as "at least a curable amount". This is to signify that the amount used is not less than that quantity generally used by those skilled in the art to fully cure the amount of epoxy compound in the latex. Generally speaking, epoxy curing agents are calculated stoichiometrically on the basis of one active hydrogen in the agent for each epoxy group. It is preferred, however, to add an excess of curing agent to insure complete curing of the epoxy; generally, this does not run greater than about a 20% excess. Therefore, "a curable amount" of epoxy curing agent is to be considered herein as between 100% to 120% of the required stoichiometric amount. The epoxy curing agent is merely stirred or emulsified into the latex; it will not effect curing until the temperature is raised to the appropriate curing temperature. During curing of the epoxy compound, there may be some cross-linking with the styrene-butadiene copolymer however the extent of this reaction is not known.

A salient feature of this composition is its good shelf life. Whereas conventional aqueous adhesives have relatively short ( 1 day – 2 weeks) shelf life, this composition has a shelf life in excess of 3 months. Another meritorious feature is that the composition does not exhibit a decline in bonding ability when coated on a bright steel substrate and stored in air over a period of time. Neither does the bond between rubber encased steel (with the adhesive at the interface) deteoriate upon prolonged exposure to air. This is significant since, as the examples will later show, both the bonding ability and the bond of conventional adhesives deteoriate under these conditions.

The composition comprising the styrene-butadiene-carboxylic acid polymeric latex, the water-soluble epoxy compound, and the epoxy curing agent generally runs from about 40% to about 60% total solids although the solids content may be varied outside of these limits for special circumstances. In addition, it is generally advisable to add a few drops of ammonium hydroxide or other alkaline agent to the composition to make it slightly alkaline for the purposes of insuring its stability and shelf life.

The method of bonding bright steel or bright alloy steel to natural rubber and synthetic replacements therefor using the curable adhesive composition of this invention generally comprises the steps of: first, making or preparing the above-described latex composition; secondly, coating the steel with a thin layer of the composition; thirdly, drying the coating such as by air drying or heating in an oven at slightly elevated temperatures; fourthly, curing the adhesive, i.e. crosslinking the epoxy (and possibly some of the styrene-butadiene copolymer and carboxylic acid) using curing temperatures commensurate with the particular materials used such as 200° to 500°F., and lastly, encasing the cured adhesive coated bright steel or bright alloy steel in a curable natural rubber compound or synthetic replacement therefor to form a partially bonded article. Full bond strength, of course, is not fully achieved until the curable rubber, encasing the steel, is cured.

With respect to the formation of rubber covered bright steel tire cords, the above-identified method is followed and the last step, i.e., the encasement of the adhesive coated steel wire with rubber, is accomplished by passing the wires through the nip of a calender that contains a roll or reservoir of curable, milled rubber so that the output from the mill is a thin sheet of curable rubber containing the adhesive coated steel wires in parallel alignment encased therein.

A separate embodiment of this invention is the addition to the composition of from about 10 to about 30 parts and preferably about 25 parts of a wax that has a melting point ranging from about 60° to 100°C. It has been found that this addition of wax provides a significant improvement in the adhesion obtained with the composition. The wax is most conveniently incorporated into the adhesive composition by melting it and pouring it slowly into the latex under vigorous agitation. It has been found that melted waxes with melting points between 60° to 100°C. emulsify very well into the latex and do not separate upon cooling or upon standing of the composition. It appears that there is sufficient emulsifier in the styrene-butadiene-carboxylic acid polymeric latex to emulsify the wax without further addition of emulsifying agent. It further appears that the polymerized carboxylic acid acts as an important emulsifier for the wax since, when no carboxylic acid is present in the latex, little if any emulsification of the melted wax takes place and it either clumps or lumps in the mixer or settles out upon standing, whereas where the carboxylic acid content is above about 6 parts by weight per 100 parts by weight of latex solids, emulsion of the wax takes place, however, the latex is very thick.

It has been found advantageous on some occasions to melt the wax (if needed) and emulsify it in water using a little surface active agent or surfactant and then adding this emulsion to the latex.

There are a wide range of waxes usable herein including mineral waxes, such as paraffin, microcrystalline, oxidized microcrystalline, Montan, Hoechst waxes and Ozokerite; vegetable waxes, such as Carnauba wax, esparto, flax, sugercane wax, and Candelilla; animal waxes, such as beeswax; and synthetic waxes, such as Fischer-Tropsch and polyethylene waxes. By and large, paraffin waxes having the above-described melting point range are the most preferred from the standpoint of providing the greatest amount of adhesion improvement in the composition.

As a further embodiment of this invention, soluble phosphates such as sodium phosphate or tetrasodium pyrophosphate may be added to the adhesive composition in amounts ranging from about 0.1 to 10.0 parts by weight per 100 parts by weight of latex solids to improve adhesion between the rubber and the steel and also to aid in inhibiting corrosion of the bright steel surface. Other additives to the composition contemplated herein include antioxidants to improve the stability of the material; preferred among these antioxidants are polymeric hindered phenols, such as Wingstay L, marketed by the Goodyear Tire & Rubber Company.

The following examples are given to provide one skilled in the art with an indication of how to practice this invention and to show some of the various efficacious results obtainable therefrom. Unless otherwise noted, all parts are parts by weight and all percentages are percentages by weight.

EXAMPLE I

An aqueous composition was prepared according to the teachings of this invention by first making a latex of the following recipe:

| Ingredients | Parts |
|---|---|
| Styrene | 42.50 |
| Butadiene | 42.50 |
| Water | 93.00 |
| Surfactant — Monawet MB45 | 1.25 |
| — Dow Fax 2A1 | 0.25 |
| Catalyst — ammonium persulfate | 0.25 |
| Chain terminator — sulfol 120 | 1.00 |
| Chelator — Sequestrene N3T | 0.05 |

The emulsion was agitated at 60°C. for 6 hours after which 1.00 part of methacrylic acid, dissolved in 10.00 parts water and 0.5 parts (surfactant) Siponate DBS 10, was added and the agitation and heat continued thereafter for a total of 12½ hours. Conversion was 99+% and total solids were 45%.

To 222 parts of the 45% soldis latex (100 parts total solids) was then added 200 parts of a 10% aqueous solution of a water-soluble epoxy compound, NER-010A, which is diglycidyl ether of glycerol in a clear liquid form having an epoxy content of 153, a viscosity of 110 cps. at 25°C., a specifice gravity of 1.23 and is manufactured by Nagase & Co., Ltd., Osaka, Japan. The epoxy solution was stirred until fully blended into the latex. Thereafter, 160 parts of a 10% aqueous solution of tetraethylene pentamine (epoxy curing agent) was stirred into the latex until a homogeneous blend was formed.

Pieces of E4130 electric furnace steel of a size of 2⅜ inch × 1 inch × one-sixteenth inch were sandblasted, pickled for 5 minutes at 80°C. in a 5% aqueous solution of itaconic acid, and then rinsed in water and dried.

A curable natural rubber tire stock compound was prepared according to the following formulation:

| Ingredients | Parts |
|---|---|
| Natural rubber | 100.00 |
| Carbon black | 50.00 |
| Sulfur | 3.80 |
| Accelerator | 1.00 |
| Activator | 12.00 |
| Plasticizer | 3.00 |
| Antioxidant | 2.00 |

The rubber was milled until workable and the rest of the ingredients added and dispersed therein per general rubber compounding procedures.

The aqueous composition was thereafter brushed onto one surface of the pieces of steel and the excess was allowed to run off. The coating was dried at room temperature and then the pieces were heated to 450°F. for 3 minutes to cure the adhesive. Thereafter, strips of the curable natural rubber stock compound were pressed tightly against the adhesive coated surfaces to form a rubber-adhesive-steel laminate. The laminate was heated at 287°F. for 1 hour to cure the rubber. Testing was done by stripping the rubber from the metal. Values of 120 to 150 pounds of stripping force were obtained for the different pieces; any failure was always in the rubber phase. In a similar test wherein no adhesive was used, there was no adhesion at all between the rubber and the metal.

EXAMPLE II

An aqueous composition was prepared according to the teachings of this invention by first making a latex of the following recipe:

| Ingredients | Parts |
|---|---|
| Styrene | 48.00 |
| Butadiene | 50.00 |
| Water | 93.00 |
| Surfactant — Monawet MB45 | 1.25 |
| — Dow Fax 2A1 | 0.25 |
| Catalyst — ammonium persulfate | 0.25 |
| Chain terminator — Sulfol 120 | 1.00 |
| Chelator — Sequestrone N3T | 0.05 |

The emulsion was agitated at 60°C. for 6 hours after which 1.50 parts of itaconic acid and 0.5 parts of methacrylic acid, dissolved in 10.00 parts water and 0.5 parts (surfactant) Siponate DBS10, was added and the agitation and heat continued thereafter for a total of 12½ hours. Conversion was 99+% and total solids were 48%.

To 208 parts of the 48% solids latex (100 parts total solids) was then added 160 parts of a 10% aqueous solution of a water-soluble epoxy compound Araldite RD-2 made by CIBA and blended therein. Then 64 parts of a 10% aqueous solution of tetraethylene pentamine was blended therein.

A sample of Bekaert steel wire, a bright steel alloy wire (construction 1 × 3 + 5 × 7 × 0.0059 inches) rubber tire reinforcement, was sandblasted and cleaned of adhering dust and other foreign matter and then rendered corrosion resistant by dipping it in a heated (90°C.) 1% solution of sodium dihydrogen phosphate, rinsing with water, and drying.

* This is a tire cord terminology and means that the cord is made of 1 center bundle (strand) of 3 wires (filaments) and is surrounded by 5 bundles of 7 wires wherein all of the wires are 0.0059 inch nominal diameter. For further clarification see RUBBER AGE, May, 1971, page 59.

The tire cord was cut into 16, 12 inch segments and each segment dipped into the adhesive composition, shaken to remove the excess, air dried at room temperature, and then cured at 450°F. for three minutes. One portion of each of the 16 pieces of adhesive coated wire was then sandwiched (perpendicularly) in between strips of curable polyisoprene rubber stock to form a pad 9½ inches long, one-half inch wide, and five-eighths inch high. Thereafter the pad with the wires embedded therein was cured in an oven at 287° F. for 35 minutes. The pad containing the wires was trimmed and placed in the top vise grip of a testing machine and the free ends of the wires clamped into the bottom grip of the machine. All 16 wires were individually pulled from the rubber pad and the average of the sixteen pulls calculated to be the pull-out adhesion strength. The experiment was repeated three more times using (1) brass-plated Bekaert wire cord (without adhesive), (2) brass-plated Glanzstoff wire cord (without adhesive), and (3) bright Bekaert steel wire cord with Thixon adhesive (a commercial adhesive) manufactured by Dayton Chemical Products Laboratories, Inc. in lieu of the novel adhesive of this invention. Pull-out tests were conducted on each of these four different wires and the averages are shown below in Table I. Separate samples of each were made and tested later, after exposure to air at room temperature for various periods; these values also appear in Table I.

TABLE 1

| | Average Pull Out Adhesion in Pounds | | | |
|---|---|---|---|---|
| | 0 | 1 Day | 2 Days | 8 Days |
| 1) Bright tire cord with adhesive of this invention | 165 | 156 | 151 | 160 |
| 2) Brass-plated Bekaert wire | 158 | — | 147 | 98 |

TABLE 1-Continued

| | Average Pull Out Adhesion in Pounds | | | |
|---|---|---|---|---|
| | 0 | 1 Day | 2 Days | 8 Days |
| 3) Brass-plated Glanzstoff wire | 189 | — | 148 | 83 |
| 4) Bright tire cord with commercial adhesive | 87.4 | — | — | — |

This example shows that the composition of this invention not only provides a high degree of bonding but the bond strength is maintained at or near its original level after prolonged exposure to a normal atmospheric environment whereas the other bonding methods show rapid deterioration in bond strength under the same conditions.

EXAMPLE III

Example II was repeated on the Bekaert bright steel and brass-plated steel wires; the adhesive of this invention was used on the bright wire whereas no adhesive was used on the brass-plated wire. Separate samples of each were exposed to 300°F. in nitrogen and in 100% relative humidity for periods of 24 hours each to simulate pneumatic tire environments. The bond strength history of each sample is listed below in Table 2.

TABLE 2

| | Average Pull Out Adhesion in Pounds | | |
|---|---|---|---|
| | Original | 24 hrs. at 300°F. $N_2$ | 24 hrs. at 300°F. 100% RH |
| 1) Bekaert bright wire & adhesive of this invention | 150 | 141 | 126 |
| 2) Bekaert brass-plated wire without adhesive | 191 | 28 | 22 |

EXAMPLE IV

Example I was repeated except that 25 parts of a paraffinic wax, having a melting point of 75° C. and made by The Mobile Oil Company was melted and added to the latex under agitation so as to form a homogeneous emulsion. Next was added 0.5 parts Wingstay L antioxidant and 0.20 parts sodium phosphate. The resulting composition had good shelf life and stability and improved adhesion over that obtained in Example I.

EXAMPLE V a. Example I was repeated except that no polymerizable carboxylic acid was added to the latex. No adhesion to the bright steel was obtained.

b. Example I was repeated except that a resorcinol-formaldehyde resin was added to the latex in place of the water-soluble epoxy resin. No adhesion to the bright steel was obtained.

c. Example I was repeated except that 5.0 parts of acrylonitrile was polymerized along with the styrene, butadiene, and carboxylic acid. Adhesion to the bright steel was greatly reduced.

EXAMPLE VI

Example II was repeated on Bekaert bright steel wire after the aqueous composition was aged for various periods. The bond strength of each sample was obtained as described in that example and is shown below in Table 3.

TABLE 3

| Age of Aqueous Composition | Average Pull Out Strength in Pounds |
|---|---|
| 1 day | 165 |
| 7 days | 166 |
| 2 weeks | 157 |
| 3 weeks | 181 |
| 4 weeks | 153 |
| 10 weeks | 164 |

In addition, the aqueous composition showed no change in total solids (30.3 percent), pH (9.8), Brookfield viscosity (10.5 cp), and surface tension (44.0) after 10 weeks.

EXAMPLE VII

Example II was repeated except that different epoxy compounds were used. The adhesion of the coated bright steel wires was then observed and the observations are listed below in Table 4:

TABLE 4

| Epoxy Compound | % Water Soluble | Amount Used | Adhesion (Lb) |
|---|---|---|---|
| Araldite | 100 | 16 parts | 165 |
| 1 epoxyethyl-3,4-epoxycyclohexane | 18.3 | 20 parts | 160 |
| Limonene dioxide | 3.24 | 20 parts | 160 |
| EPON 828* | 0 ** | 15 parts | NIL |

* Shell Chemical Company
** Used in a fine dispersion in water.

This example shows the lower limit of 3% water solubility of the epoxy compound as providing an operative adhesive.

What is claimed is:

1. A curable adhesive composition for bonding bright steel and bright alloy steels to natural rubber and synthetic replacements therefor consisting of, in water, the following admixture wherein the ingredients are in parts by weight per 100 parts by weight of latex solids:
   a. a styrene-butadiene-carboxylic acid polymeric latex having a styrene to butadiene ratio of from 30:70 to 70:30 and containing the polymerization product of from about 0.5 to about 2.5 parts of a polymerizable carboxylic acid;
   b. a liquid epoxy compound with an average molecular weight ranging from 100 to 450 and an epoxide equivalent of at least 50 and that is water soluble to the extent of at least 97% by weight, in an amount from about 10 to about 50 parts; and,
   c. at least a curable amount of an epoxy curing agent selected from the class of polyfunctional primary, secondary and tertiary amines.

2. The composition of claim 1 wherein said styrene to butadiene ratio is from 50:50 to 40:60.

3. The composition of claim 1 wherein said polymerizable carboxylic acid is selected from the group consisting of monocarboxylic acids, dicarboxylic acids, tricarboxylic acids, and mixtures thereof.

4. The composition of claim 3 wherein said polymerizable carboxylic acid is selected from the group consisting of methacrylic acid, acrylic acid, and itaconic acid.

5. The composition of claim 1 wherein said water-soluble epoxy compound is a diglycidyl ether of 1,4-butane diol.

6. The composition of claim 1 wherein said water-soluble epoxy compound is a diglycidyl ether of glycerol.

7. The composition of claim 1 including up to 30 parts of a wax having a melting point between 60° to 100°C. emulsified therein.

8. The composition of claim 7 wherein said wax is a paraffinic wax.

9. The composition of claim 1 including from about 0.10 to 10.0 parts of a soluble phosphate.

10. The composition of claim 9 wherein said soluble phosphate is sodium phosphate.

11. The composition of claim 9 wherein said soluble phosphate is tetrasodium pyrophosphate.

12. The composition of claim 1 including an antioxidant.

* * * * *